(12) United States Patent
Huang

(10) Patent No.: US 10,143,952 B2
(45) Date of Patent: Dec. 4, 2018

(54) FILTER FRAME

(71) Applicant: GREENFILTEC PTE. LTD., Hsinchu (TW)

(72) Inventor: Ming-Wen Huang, Hsinchu (TW)

(73) Assignee: GREENFILTEC PTE. LTD., Hsinchu (TW)

( * ) Notice: Subject to any disclaimer, the term of this patent is extended or adjusted under 35 U.S.C. 154(b) by 337 days.

(21) Appl. No.: 15/256,380

(22) Filed: Sep. 2, 2016

(65) Prior Publication Data

US 2017/0333821 A1 Nov. 23, 2017

(30) Foreign Application Priority Data

May 20, 2016 (CN) ...................... 2016 2 0466233 U

(51) Int. Cl.
| | |
|---|---|
| *B01D 46/00* | (2006.01) |
| *B01D 29/56* | (2006.01) |
| *B01D 29/05* | (2006.01) |
| *B01D 46/10* | (2006.01) |
| *B01D 35/30* | (2006.01) |

(52) U.S. Cl.
CPC ......... *B01D 46/0005* (2013.01); *B01D 29/05* (2013.01); *B01D 29/56* (2013.01); *B01D 35/303* (2013.01); *B01D 46/0002* (2013.01); *B01D 46/0023* (2013.01); *B01D 46/10* (2013.01); *B01D 2201/0415* (2013.01); *B01D 2201/4092* (2013.01); *B01D 2265/029* (2013.01); *B01D 2267/30* (2013.01)

(58) Field of Classification Search
CPC .... B01D 2201/0415; B01D 2201/4092; B01D 2265/029; B01D 2267/30; B01D 29/05; B01D 29/56; B01D 35/303; B01D 46/0002; B01D 46/0005; B01D 46/0023; B01D 46/10
See application file for complete search history.

(56) References Cited

U.S. PATENT DOCUMENTS

2007/0261555 A1* 11/2007 Aubert ...................... B03C 3/12
96/66

* cited by examiner

*Primary Examiner* — Dirk R Bass
(74) *Attorney, Agent, or Firm* — AEON Law, PLLC; Adam L. K. Philipp

(57) ABSTRACT

A filter frame provided in the present invention comprises a frame body including a plurality of frame strips which are combined together to form filter net disposing area, a filter net fixing member, an upper circumferential surface connecting member, a lower circumferential surface connecting member, and an adjacent member. The upper circumferential surface connecting member and the lower circumferential surface connecting member are respectively disposed along the upper circumferential surfaces and the lower circumferential surfaces of the frame strips in such a manner that the filter frame is connected to a second filter frame and/or a third filter frame along the normal direction of the filter net disposing area. The adjacent member is disposed along the outer circumferential surface of the frame strip to form an adjacent channel extending along the frame strip in such a manner that the filter frame is adjacently connected to a fourth filter frame.

8 Claims, 5 Drawing Sheets

FILTER FRAME

FIELD OF THE INVENTION

The present invention relates to a filter frame, and more particularly to a filter frame which is able to be connected in a plurality of directions.

BACKGROUND OF THE INVENTION

A filtering apparatus of prior art usually includes an box-shaped equipment housing and several filter nets disposed in the equipment housing, allowing a fluid to flow through the filter nets along a filtering direction to achieve filtration.

However, such filtering apparatus is hard to be flexibly adapted to suit various requirements of filtration. For example, a box-shaped equipment housing appears to be bulky and inconvenient when less filter nets are required. On the contrary, if more filter nets are required, such filtering apparatus does not allow extra filter nets to be disposed in the equipment housing, which requires the purchase of another suitable filtering apparatus. In addition, a filtering apparatus with smaller filter area is hard to used in a situation where larger filter area is needed. However, a filtering apparatus with larger filter area is bulky and inconvenient to use. On the other hand, it is costly to have a filtering apparatus made-to-order with required size or shape according to the requirement.

SUMMARY OF THE INVENTION

Accordingly, the objective of the present invention is to provide a filter frame which is able to be connected in a plurality of directions.

The filter frame of the present invention comprises a frame body including a plurality of frame strips, a filter net fixing member, an upper circumferential surface connecting member, a lower circumferential surface connecting member, and an adjacent member. Each of the frame strips has an outer circumferential surface and an inner circumferential surface, and the plurality of frame strips are combined together to form a filter net disposing area at an inner side of the inner circumferential surface of the plurality of frame strips. Each of the frame strips has an upper circumferential surface and a lower circumferential surface both being disposed along a normal direction of the filter net disposing area. The filter net fixing member is disposed at the inner side of the inner circumferential surface of the plurality of frame strips so as to fix a filter net at the filter net disposing area. The upper circumferential surface connecting member is disposed along the upper circumferential surfaces of the plurality of frame strips, in which the upper circumferential surface connecting member has a first wall portion which extends outward from the outer circumferential surface of the frame strip, and a second wall portion which extends outward from the inner circumferential surface of the frame strip, wherein an upper circumferential surface channel is formed by the first wall portion, the second wall portion and the upper circumferential surface of the frame strip. The lower circumferential surface connecting member is disposed along the lower circumferential surfaces of the plurality of frame strips. The position of the upper circumferential surface connecting member and position of the lower circumferential surface connecting member are configured as being corresponding to each other along the normal direction, and the size of the outer diameter of the lower circumferential surface connecting member is arranged to match with the size of the inner diameter of the upper circumferential surface connecting member. The adjacent member is disposed along the outer circumferential surface of the frame strip, in which the adjacent member has a first adjacent wall portion, a second adjacent wall portion and an outer concave portion concavely provided between the first adjacent wall portion and the second adjacent wall portion. The first adjacent wall portion, the second adjacent wall portion and the outer concave portion are provided extending along the outer circumferential surface of the frame strip so as to form an adjacent channel extending along the frame strip, and the adjacent channel has a smaller outside portion and a larger inside portion. The upper circumferential surface connecting member of the filter frame, which is taken as a first filter frame, is arranged to engage with a lower circumferential surface connecting member of another filter frame, which is taken as a second filter frame, along the normal direction by said upper circumferential surface connecting member, and/or the lower circumferential surface connecting member of the first filter frame is arranged to engage with an upper circumferential surface connecting member of another filter frame, which is taken as a third filter frame, in such a manner that the first filter frame is connected to the second filter frame and/or connected to the third filter frame along the normal direction of the filter net disposing area. The first adjacent wall portion of the first filter frame is configured to align to and face a first adjacent wall portion of another filter frame, which is taken as a fourth filter frame, and the second adjacent wall portion of the first filter frame is configured to align to and face a second adjacent wall portion of the fourth filter frame such that the said adjacent channel of the first filter frame is adjacent to an adjacent channel of the fourth filter frame adjacently to form a bolt-insertion space. The bolt-insertion space inserted by a bolt which has a shape matching the bolt-insertion space in such a manner that the first filter frame is adjacently connected to the fourth filter frame by enabling the outer circumferential surface of the first filter frame to be adjacent to an outer circumferential surface of the fourth filter frame.

According to one embodiment of the present invention, the lower circumferential surface connecting member has a third wall portion, a fourth wall portion which extend downwardly from and out of the lower circumferential surface of the frame strips, and a lower concave portion connected between the third wall portion and the fourth wall portion.

According to one embodiment of the present invention, the first adjacent wall portion, the second adjacent wall portion, and the outer concave portion are disposed at the outer circumferential surface at each frame strip.

According to one embodiment of the present invention, t the filter net fixing members are disposed at opposite sides of the inner circumferential surface of the frame body.

According to one embodiment of the present invention, the filter net fixing member includes a supporting flange portion and a filter net fixing bracket, the supporting flange portion being protruded inwardly from the inner circumferential surface of the frame strip, the filter net fixing bracket being engaged with the supporting flange portion, the filter net fixing bracket being protruded upwardly from the supporting flange portion along the normal direction and being spaced from the inner circumferential surface of the frame strip in such a manner that the filter net fixing bracket and the inner circumferential surface of the frame body are configured to form a filter net clamping slot which supports and fixes the filter net.

According to one embodiment of the present invention, the filter net has a filtering surface and an engaging component connected to the filtering surface, the filter net being connected to the filter net fixing bracket by the engaging component.

According to one embodiment of the present invention, each said frame strip is a hollow frame strip composed of a number of plate-shaped walls.

According to one embodiment of the present invention, the frame strip, the filter net fixing member, the upper circumferential surface connecting member, the lower circumferential surface connecting member, the first adjacent wall portion, the second adjacent wall portion, and the outer concave portion are integrally formed.

By means of the technical means of the present invention, each filter frame is able to be equipped with at least one filter net. A plurality of the filter frames can be connected to each other along the normal direction of the filter net disposing area, and the filter frames are able to be adjacently connected to another respectively by connecting the outer circumferential surfaces of each frame strips. Accordingly, a plurality of filter frames can be combined along the normal direction of the filter net disposing area wherein the number of filter frames being connected is in accordance with different filtering requirements. Moreover, by connecting the outer circumferential surfaces, the plurality of filter frames can be combined into various filtering apparatuses with different shapes and/or different filtration areas to be adapted to suit different situations and thus achieve the advantages of being lightweight and flexible.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The embodiments of the present invention are described below with reference to FIG. 1 to FIG. 5. The description is for describing the preferred embodiments of the present invention, and is not intended to limit the way of embodying the present invention.

Figure 1:
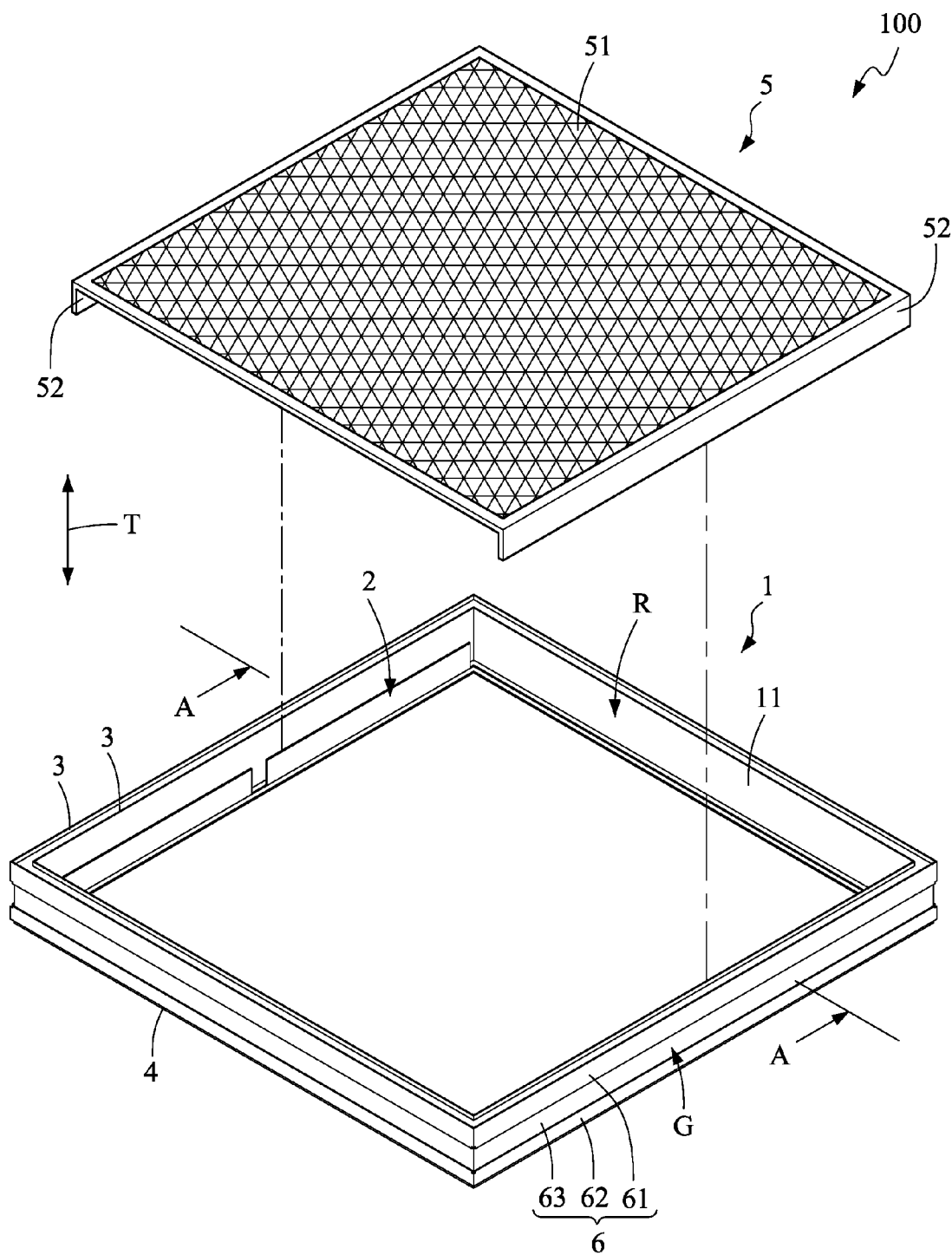
FIG. 1 is a perspective view of schematic diagram illustrating the filter frame according to one embodiment of the present invention.

With reference to FIG. 1, a first filter frame 100 according to one embodiment of the present invention comprises a frame body 1, a filter net fixing member 2, an upper circumferential surface connecting member 3, a lower circumferential surface connecting member 4, and an adjacent member 6.

Figure 2:
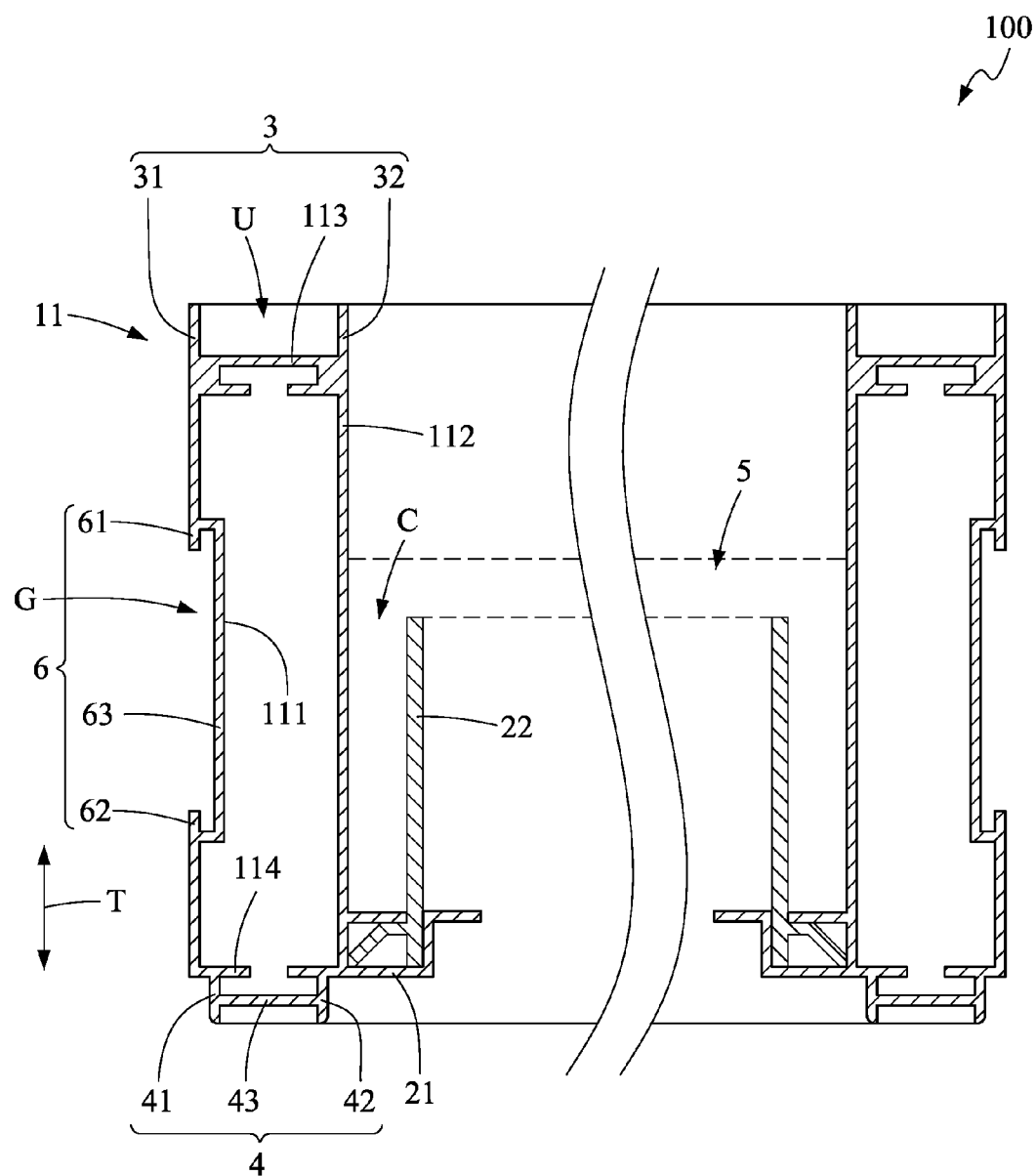
FIG. 2 is a sectional view of schematic diagram illustrating the filter frame according to the embodiment of the present invention.

FIG. 2 is a sectional view taken along the line A-A of FIG. 1. The frame body 1 includes a plurality of frame strips 11. Each of the frame strips 11 has an outer circumferential surface 111 and an inner circumferential surface 112, and the plurality of frame strips 11 are combined together to form a filter net disposing area R at an inner side of the inner circumferential surface 112 of the plurality of frame strips 11. Each of the frame strips 11 has an upper circumferential surface 113 and a lower circumferential surface 114 both being disposed along a normal direction T of the filter net disposing area R. In this embodiment, the frame body 1 has four frame strips 11 in a manner that the frame body is square-shaped. But the present invention is not limited to this. The shape of the frame body 1 can be rectangular or rhombic. The frame body 1 can have three frame strips 11 to form a triangle, or have more frame strips 11 to form a polygon.

The filter net fixing member 2 is disposed at the inner side of the inner circumferential surface 112 of the plurality of frame strips 11 so as to fix a filter net 5 at the filter net disposing area R. In the embodiment, the filter net fixing members 2 are disposed at opposite sides of the inner circumferential surface 112 of the frame body 1. The filter net fixing member 2 includes a supporting flange portion 21 and a filter net fixing bracket 22. The supporting flange portion 21 is protruded inwardly from the inner circumferential surface 112 of the frame strip 11, and the filter net fixing bracket 22 is engaged with the supporting flange portion 21. The filter net fixing bracket 22 is protruded upwardly from the supporting flange portion 21 along the normal direction T and is spaced from the inner circumferential surface 112 of the frame strip 11 in such a manner that the filter net fixing bracket 22 and the inner circumferential surface 112 of the frame body 1 are configured to form a filter net clamping slot C which supports and fixes the filter net 5. In this embodiment, the first filter frame 100 includes the detachable filter net 5. The filter net 5 has a filtering surface 51 and an engaging component 52 connected to the filtering surface 51. The filter net 5 is connected to the filter net fixing bracket 22 by the engaging component 52. In detail, in this embodiment, the engaging component 52 is placed into the filter net clamping slot C.

The upper circumferential surface connecting member 3 is disposed along the upper circumferential surfaces 113 of the plurality of frame strips 11. The upper circumferential surface connecting member 3 has a first wall portion 31 which extends outward from the outer circumferential surface 111 of the frame strip 11, and a second wall portion 32 which extends outward from the inner circumferential surface 112 of the frame strip 11, wherein an upper circumferential surface channel U is formed by the first wall portion 31, the second wall portion 32 and the upper circumferential surface 113 of the frame strip 11.

The lower circumferential surface connecting member 4 is disposed along the lower circumferential surfaces 114 of the plurality of frame strips 11. The position of the upper circumferential surface connecting member 3 and the position of the lower circumferential surface connecting member 4 are configured as being corresponding to each other along the normal direction T, and the size of the outer diameter of the lower circumferential surface connecting member 4 is arranged to match the size of the inner diameter of the upper circumferential surface channel U. In this embodiment, the lower circumferential surface connecting member 4 has a third wall portion 41 and a fourth wall portion 42 which extend downwardly from and out of the lower circumferential surface 114 of the frame strips 11, and a lower concave portion 43 connected between the third wall portion 41 and the fourth wall portion 42.

The adjacent member 6 is disposed along the outer circumferential surface 111 of the frame strip 11. The adjacent member 6 has a first adjacent wall portion 61, a second adjacent wall portion 62, and an outer concave portion 63 concavely provided between the first adjacent wall portion 61 and the second adjacent wall portion 62. And the first adjacent wall portion 61, the second adjacent wall portion 62, and the outer concave portion 63 are provided extending along the outer circumferential surface 111 of the frame strip 11 so as to form an adjacent channel G extending along the frame strip 11. The adjacent channel G has a smaller outside portion and a larger inside portion.

Figure 3:
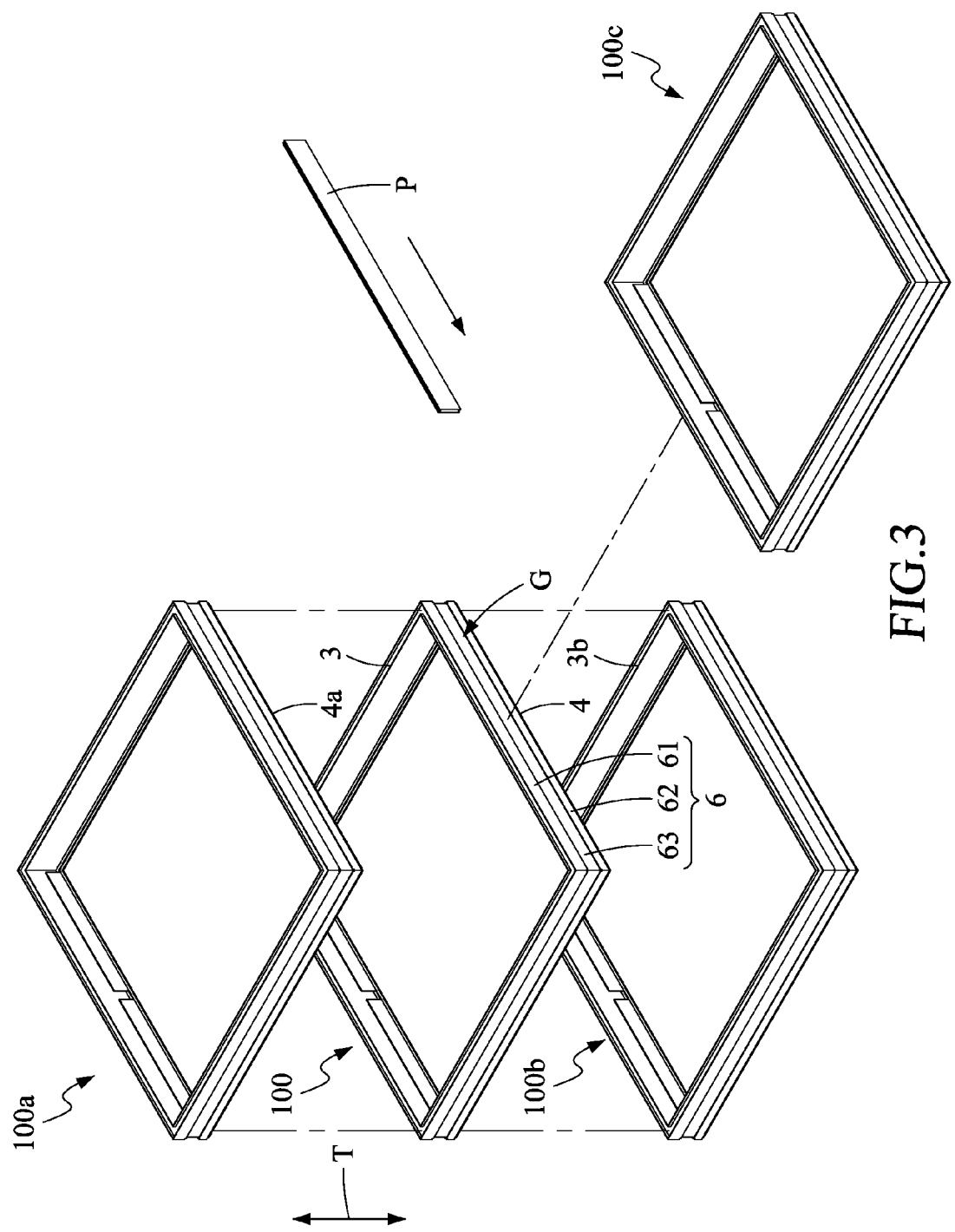
FIG. 3 is a perspective view of schematic diagram illustrating several filter frames connected to each other according to the embodiment of the present invention.
Figure 4:
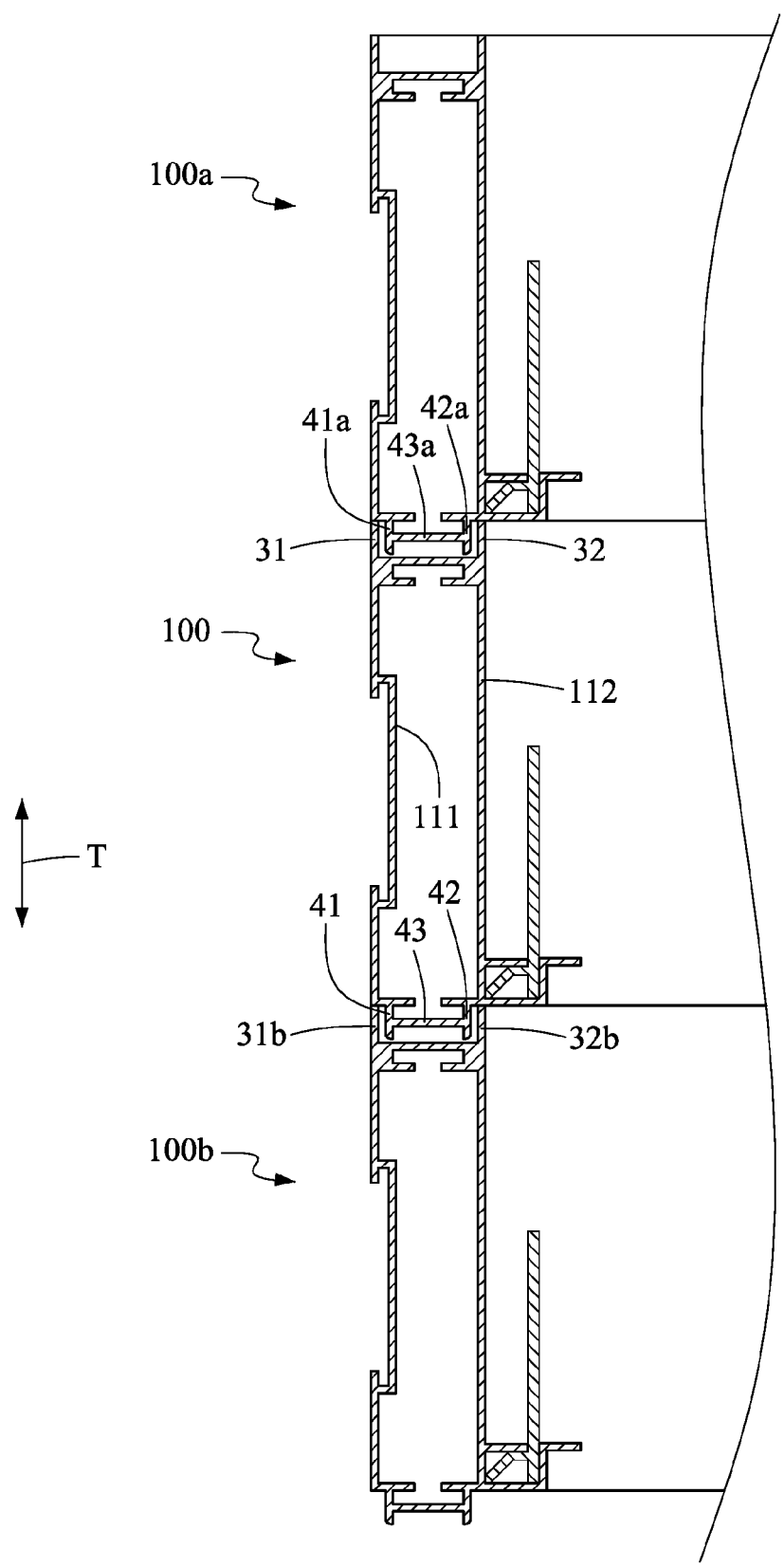
FIG. 4 is a sectional view of several filter frames connected along the normal direction according to the embodiment of the present invention.

As shown in FIG. 3 and FIG. 4, the upper circumferential surface connecting member 3 of the first filter frame 100 of the present invention is arranged to engage with a lower circumferential surface connecting member 4a of a second filter frame 100a along the normal direction T by said upper circumferential surface connecting member 3, and the lower circumferential surface connecting member 4 of the first filter frame 100 is arranged to engage with an upper circumferential surface connecting member 3b of a third filter frame 100b in such a manner that the first filter frame 100 is connected to the second filter frame 100a and connected to the third filter frame 100b along the normal direction T of the filter net disposing area R. In detail, the size of the inner diameter of the upper circumferential surface channel U of the first filter frame 100 is arranged to match the size of the outer diameter of the third wall portion 41a and the fourth wall portion 42a of the lower circumferential surface connecting member 4a of the second filter frame 100a in such a manner that the third wall portion 41a, the fourth wall portion 42a, and the lower concave portion 43a of the lower circumferential surface connecting member 4a of the second filter frame 100a are accommodated in the upper circumferential surface channel U of the first filter frame 100. On the other hand, the outer diameter of the lower circumferential surface connecting member 4 of the first filter frame 100 is arranged to match the size of the inner diameter of the upper circumferential surface channel of the third filter frame 100 formed by the first wall portion 31b and the second wall portion 32b of the third filter frame 100b in such a manner that the third wall portion 41, the fourth wall portion 42, and the lower concave portion 43 of the first filter frame 100 are accommodated in the upper circumferential surface channel of the third filter frame 100b.

Figure 5:
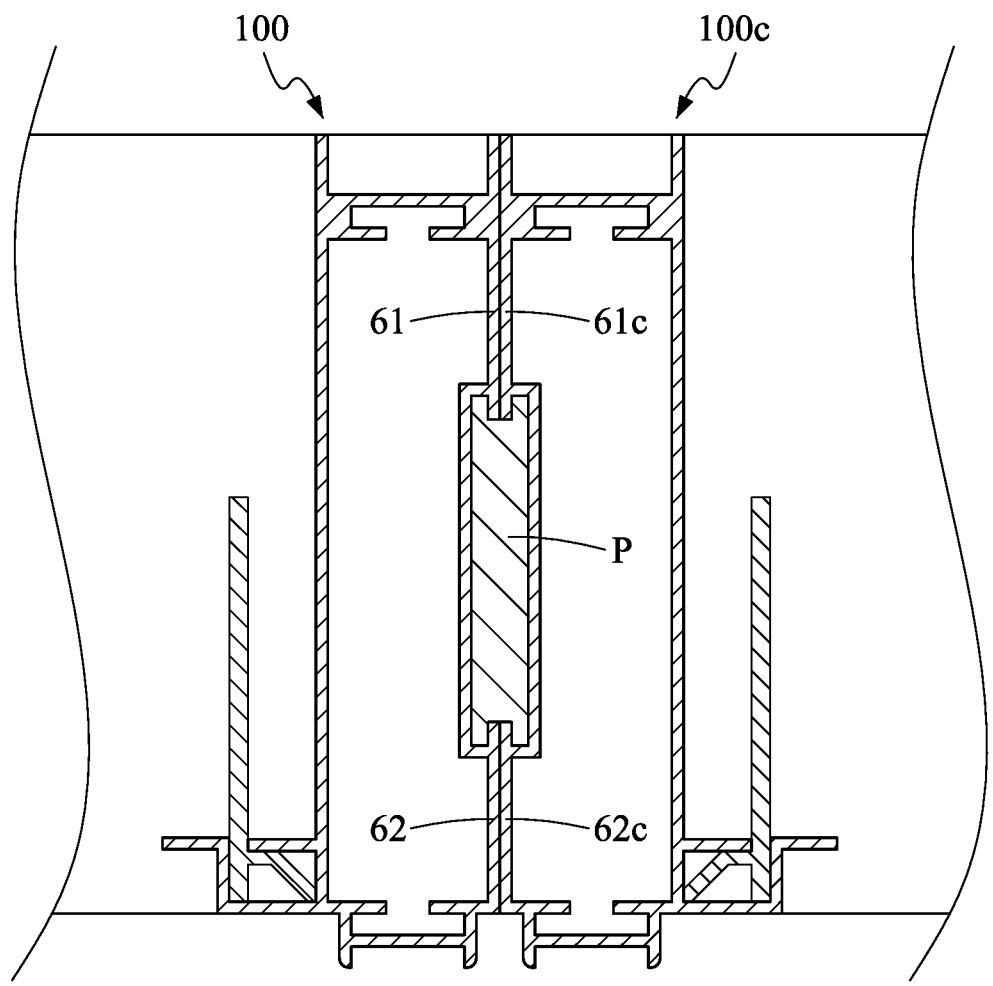
FIG. 5 is a sectional view of two filter frames adjacently connected to each other according to the embodiment of the present invention.

As shown in FIG. 3 and FIG. 5, the first adjacent wall portion 61 of the first filter frame 100 of the present invention is configured to face and align with a first adjacent wall portion 61c of a forth filter frame 100c, and the second adjacent wall portion 62 is configured to face and align with a second adjacent wall portion 62c of the fourth filter frame 100c such that the adjacent channel G is adjacent to an adjacent channel of the fourth filter frame 100c adjacently to form a bolt-insertion space. And the bolt-insertion space is inserted by a bolt P which has a shape matching the bolt-insertion space in such a manner that the first filter frame 100 is adjacently connected to the fourth filter frame 100c by enabling the outer circumferential surface 111 to be adjacent to an outer circumferential surface of the fourth filter frame 100c.

In the embodiment, the first adjacent wall portion 61, the second adjacent wall portion 62, and the outer concave portion 63 are disposed at the outer circumferential surface 111 at each frame strip 11 in such a manner that the filter frame 100 is able to adjacent to other filter frames respectively at the outer circumferential surface 111 at each frame strip 11.

In this embodiment, each frame strip 11 is a hollow frame strip composed of a number of plate-shaped walls, and the frame strip 11, the filter net fixing member 2, the upper circumferential surface connecting member 3, the lower circumferential surface connecting member 4, the first adjacent wall portion 61, the second adjacent wall portion 62, and the outer concave portion 63 are integrally formed. As a result, the filter frame 100 of the present invention is light weight and easy to be mass-produced.

By the above structure, the filter frame 100 of the present invention is not only able to be connected to each other along the normal direction of the filter net disposing area R, but also able to be adjacently connected to another filter frame 100 by the outer circumferential surface 111 for being combined to form various shapes, such as T shape, L shape or squares with larger sizes, so as to be adapted to suit various situations. The filter frame 100 of the present invention is lightweight and able to suit various filtration requirements, thereby overcoming the problems of the prior art.

The above description should be considered as only the discussion of the preferred embodiments of the present invention. However, a person skilled in the art may make various modifications without deviating from the present invention. Those modifications still fall within the spirit and scope defined by the appended claims.

What is claimed is:

1. A filter frame, comprising:
a frame body including a plurality of frame strips, wherein each of the frame strips has an outer circumferential surface and an inner circumferential surface, and the plurality of frame strips are combined together to form a filter net disposing area at an inner side of the inner circumferential surface of the plurality of frame strips, and each of the frame strips has an upper circumferential surface and a lower circumferential surface both being disposed along a normal direction of the filter net disposing area;
a filter net fixing member disposed at the inner side of the inner circumferential surface of the plurality of frame strips so as to fix a filter net at the filter net disposing area;
an upper circumferential surface connecting member disposed along the upper circumferential surfaces of the plurality of frame strips, in which the upper circumferential surface connecting member has a first wall portion which extends outward from the outer circumferential surface of the frame strip, and a second wall portion which extends outward from the inner circumferential surface of the frame strip, wherein an upper circumferential surface channel is formed by the first wall portion, the second wall portion and the upper circumferential surface of the frame strip;
a lower circumferential surface connecting member disposed along the lower circumferential surfaces of the plurality of frame strips, wherein the position of the upper circumferential surface connecting member and position of the lower circumferential surface connecting member are configured as being corresponding to each other along the normal direction, and the size of the outer diameter of the lower circumferential surface connecting member is arranged to match with the size of the inner diameter of the upper circumferential surface connecting member; and an adjacent member disposed along the outer circumferential surface of the frame strip, in which the adjacent member has a first adjacent wall portion, a second adjacent wall portion and an outer concave portion concavely provided between the first adjacent wall portion and the second adjacent wall portion, wherein the first adjacent wall portion, the second adjacent wall portion and the outer concave portion are provided extending along the outer circumferential surface of the frame strip so as to form an adjacent channel extending along the frame strip, and the adjacent channel has a smaller outside portion and a larger inside portion, wherein the upper circumferential surface connecting member of the filter frame, which is taken as a first filter frame, is arranged to engage with a lower circumferential surface connecting member of another filter frame, which is taken as a second filter frame, along the normal direction by said upper circumferential surface connecting member, and/or the lower circumferential surface connecting member of the first filter frame is arranged to engage with an upper circumferential surface connecting member of another filter frame, which is taken as a third filter frame, in such a manner that the first filter frame is connected to the second filter frame and/or connected to the third filter frame along the normal direction of the filter net disposing area, and the first adjacent wall portion of the first filter frame is configured to align to and face a first adjacent wall portion of another filter frame, which is taken as a fourth filter frame, and the second adjacent wall portion of the first filter frame is configured to align to and face a second adjacent wall portion of the fourth filter frame such that the said adjacent channel of the first filter frame is adjacent to an adjacent channel of the fourth filter frame adjacently to form a bolt-insertion space, and the bolt-insertion space inserted by a bolt which has a shape matching the bolt-insertion space in such a manner that the first filter frame is adjacently connected to the fourth filter frame by enabling the outer circumferential surface of the first filter frame to be adjacent to an outer circumferential surface of the fourth filter frame.

2. The filter frame of claim 1, wherein the lower circumferential surface connecting member has a third wall portion, a fourth wall portion which extend downwardly from and out of the lower circumferential surface of the frame strips, and a lower concave portion connected between the third wall portion and the fourth wall portion.

3. The filter frame of claim 1, wherein the first adjacent wall portion, the second adjacent wall portion, and the outer concave portion are disposed at the outer circumferential surface at each frame strip.

4. The filter frame of claim 1, wherein the filter net fixing members are disposed at opposite sides of the inner circumferential surface of the frame body.

5. The filter frame of claim 1, wherein the filter net fixing member includes a supporting flange portion and a filter net fixing bracket, the supporting flange portion being protruded inwardly from the inner circumferential surface of the frame strip, the filter net fixing bracket being engaged with the supporting flange portion, the filter net fixing bracket being protruded upwardly from the supporting flange portion along the normal direction and being spaced from the inner circumferential surface of the frame strip in such a manner that the filter net fixing bracket and the inner circumferential surface of the frame body are configured to form a filter net clamping slot which supports and fixes the filter net.

6. The filter frame of claim 5, further including the filter net, wherein the filter net has a filtering surface and an engaging component connected to the filtering surface, the filter net being connected to the filter net fixing bracket by the engaging component.

7. The filter frame of claim 5, wherein each said frame strip is a hollow frame strip composed of a number of plate-shaped walls.

8. The filter frame of claim 5, wherein the frame strip, the filter net fixing member, the upper circumferential surface connecting member, the lower circumferential surface connecting member, the first adjacent wall portion, the second adjacent wall portion, and the outer concave portion are integrally formed.

* * * * *